(12) United States Patent
Bolander et al.

(10) Patent No.: US 7,059,998 B2
(45) Date of Patent: Jun. 13, 2006

(54) DOD CONTROL METHODS FOR MANUAL TRANSMISSIONS

(75) Inventors: Thomas E. Bolander, Flint, MI (US); Gregory P. Matthews, West Bloomfield, MI (US); Alexander J. Roberts, Rochester, MI (US); Jeffrey J. Allen, Kelkheim-Fischbach (DE)

(73) Assignee: General Motors Corporation, Detroit, MI (US)

( * ) Notice: Subject to any disclaimer, the term of this patent is extended or adjusted under 35 U.S.C. 154(b) by 119 days.

(21) Appl. No.: 10/807,768

(22) Filed: Mar. 24, 2004

(65) Prior Publication Data

US 2005/0215394 A1 Sep. 29, 2005

(51) Int. Cl.
*B60W 10/02* (2006.01)
*B60W 10/04* (2006.01)
*B60W 10/10* (2006.01)

(52) U.S. Cl. ..................... 477/107; 477/181
(58) Field of Classification Search ............... 477/107, 477/110, 181, 174
See application file for complete search history.

(56) References Cited

U.S. PATENT DOCUMENTS

| | | | | |
|---|---|---|---|---|
| 5,374,224 A | * | 12/1994 | Huffmaster et al. | 477/181 |
| 5,437,253 A | * | 8/1995 | Huffmaster et al. | 123/399 |
| 5,611,754 A | * | 3/1997 | Haga et al. | 477/181 |
| 5,678,674 A | * | 10/1997 | Nehse | 192/103 R |
| 6,655,353 B1 | * | 12/2003 | Rayl | 123/436 |
| RE38,615 E | * | 10/2004 | Dresden, III et al. | 74/336 R |
| 6,855,090 B1 | * | 2/2005 | Tabata et al. | 477/107 |
| 2004/0112336 A1 | * | 6/2004 | Badillo et al. | 123/406.51 |
| 2004/0249541 A1 | * | 12/2004 | Kim | 701/51 |
| 2005/0075212 A1 | * | 4/2005 | Yang et al. | 477/107 |

* cited by examiner

*Primary Examiner*—Tisha Lewis
(74) *Attorney, Agent, or Firm*—Christopher DeVries

(57) ABSTRACT

An engine control system transitions between activated and deactivated modes in a vehicle equipped with a manual transmission. The engine control system includes a clutch plate position sensor and a shifter shaft position sensor in communication with a controller. The controller determines if conditions to increase or reduce the number of active cylinders based on data collected from the position sensors, engine speed, and manifold absolute pressure. Prediction of the driver's next movements is the basis of the control. The sensors provide the history, averages, acceleration data, and velocity data, which lead to the driver's intent.

21 Claims, 5 Drawing Sheets

| | | | | | | | | |
|---|---|---|---|---|---|---|---|---|
| 00 | | | | 40 | | | | 80 |
| 01 | | | | 41 | | | | 81 |
| 02 | | | | 42 | | | | 82 |
| 03 | | | | 43 | | | | 83 |
| 04 | | | | 44 | | | | 84 |
| 05 | 15 | 25 | 35 | 45 | 55 | 65 | 75 | 85 |
| 06 | | | | 46 | | | | 86 |
| 07 | | | | 47 | | | | 87 |
| 08 | | | | 48 | | | | 88 |
| 09 | | | | 49 | | | | 89 |
| 010 | | | | 410 | | | | 810 |

*Fig-3* ature of the present invention will become more fully understood
DOD CONTROL METHODS FOR MANUAL TRANSMISSIONS

FIELD OF THE INVENTION

The present invention relates to internal combustion engines and, more particularly, to control systems that command transitions in a displacement on demand engine.

BACKGROUND OF THE INVENTION

Some internal combustion engines include engine control systems that deactivate cylinders under low load situations. For example, an eight cylinder can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

To smoothly transition between the activated and deactivated modes, the internal combustion engine must produce sufficient drive torque with a minimum of disturbances. Otherwise, the transition will not be transparent to the driver. In other words, excess torque will cause engine surge and insufficient torque will cause engine sag, which degrades the driving experience.

Conventional engine control systems have been somewhat successful in transitioning between the activated and deactivated modes in vehicles equipped with automatic transmissions. Torque converter slip algorithms are used to help smooth the transitions between DOD modes.

Engine control of vehicles equipped with manual transmissions is more challenging because the driver intent is unknown. Specifically, the control system does not have enough data to accurately determine if the driver is about to upshift and increase the load on the engine, downshift and decrease the load, or simply maintain the current gear. Due to this uncertainty, it is very difficult to determine if the engine may be placed in the deactivated mode.

SUMMARY OF THE INVENTION

The present invention provides an engine control system for controlling transitions between activated and deactivated modes in a vehicle equipped with a manual transmission. The engine control system includes a clutch plate position sensor and a shifter shaft position sensor in communication with a controller. The controller determines if conditions exist to increase or reduce the number of active cylinders based on data collected from the position sensors, engine speed, and manifold absolute pressure. Prediction of the driver's next movements is the basis of the control. The sensors provide the history, averages, acceleration data, and velocity data, which lead to the driver's intent.

One feature of the present invention includes a clutch plate position sensor which provides an indication of clutch engagement or disengagement.

In another feature, the position of the shifter shaft is measured. Additionally, the speed at which the shifter shaft is being moved and the direction the shaft is heading is also determined.

In another feature of the present invention, brake pedal position and throttle pedal position are determined. The monitored inputs are analyzed by the controller to predict the driver's next actions. The control system maintains a smooth output torque during transitions between activated and deactivated modes in the displacement on demand engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exemplary shifter shaft position map used by the control system of the present invention for a five speed manual transmission with reverse;

DETAILED DESCRIPTION OF THE PREFERRED EMBODIMENTS

Figure 1:
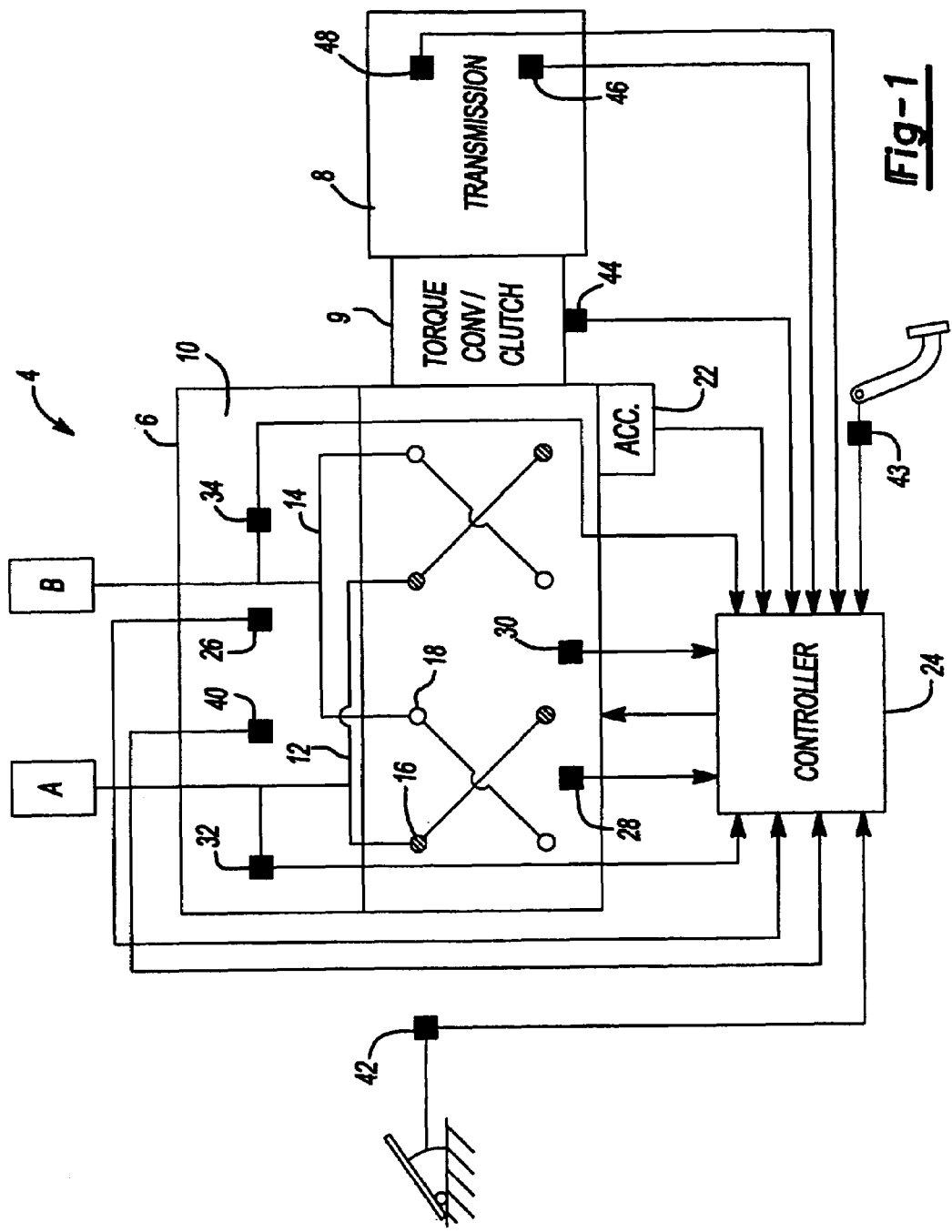
FIG. 1 is a functional block diagram illustrating a vehicle powertrain including a DOD transition control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active).

Referring now to FIG. 1, a vehicle 4 includes an engine 6 drivingly coupled to a transmission 8. Transmission 8 is either an automatic or a manual transmission that is driven by the engine 6 through a corresponding torque converter or clutch assembly 9. Air flows into the engine 6 through an intake manifold 10 having a first passageway 12 and a second passageway 14. The first and second passageways are separated from one another. A first set of engine cylinders 16 is in communication with first passageway 12 to receive an air/fuel mixture. A second set of engine cylinders 18 is in communication with second passageway 14.

A first throttle A is positioned in communication with first passageway 12 to provide an individually controlled air/fuel mixture to first set of cylinders 16. A second throttle B is in communication with second passageway 14 and second set of cylinders 18. Preferably, the number of sets of cylinders equals the number of throttles present. The air/fuel mixture is subsequently combusted within cylinders 16 and 18. Accessories 22 such as a hydraulic pump, HVAC compressor, and/or alternator are driven by the engine 6.

The engine 6 includes N cylinders. One or more of the cylinders may be selectively deactivated during engine operation. Although FIG. 1 depicts eight cylinders (N=8), it can be appreciated that the engine 6 may include additional or fewer cylinders. For example, engines having 4, 5, 6, 8, 10, 12 and 16 cylinders are contemplated. It should be appreciated that engines having more than two throttles are also contemplated. An eight cylinder engine may likely include 2, 4 or 8 throttles without departing from the scope of the present invention.

A controller 24 communicates with the engine 6 and various sensors discussed herein. An air flow sensor 26 generates a signal based on the rate of air flow through intake manifold 10. An engine speed sensor 28 generates a signal based on engine speed. An engine temperature sensor 30 generates a signal based on engine temperature. A first intake manifold pressure sensor 32 generates a signal based on a vacuum pressure within first passageway 12. A second intake manifold pressure sensor 34 generates a signal based on vacuum pressure within second passageway 14. An intake air temperature sensor 40 generates a signal based on intake air temperature. An accelerator pedal position sensor 42 generates a signal based on accelerator pedal position. A brake pedal position sensor 43 generates a signal based on brake pedal position. A clutch plate position sensor 44 generates a signal based on clutch plate position. First and second shifter shaft position sensors, 46 and 48, respectively, generate signals based on shifter shaft position.

When proper conditions exist, the controller 24 transitions the engine 6 to the deactivated mode. In an exemplary embodiment, N/2 cylinders are deactivated, although one or more cylinders may be deactivated. Upon deactivation of the selected cylinders, the controller 24 increases the power output of the remaining cylinders. The controller 24 provides DOD transition by evaluating the output of the clutch plate position sensor and shifter shaft position sensors as will be described below.

Figure 2:
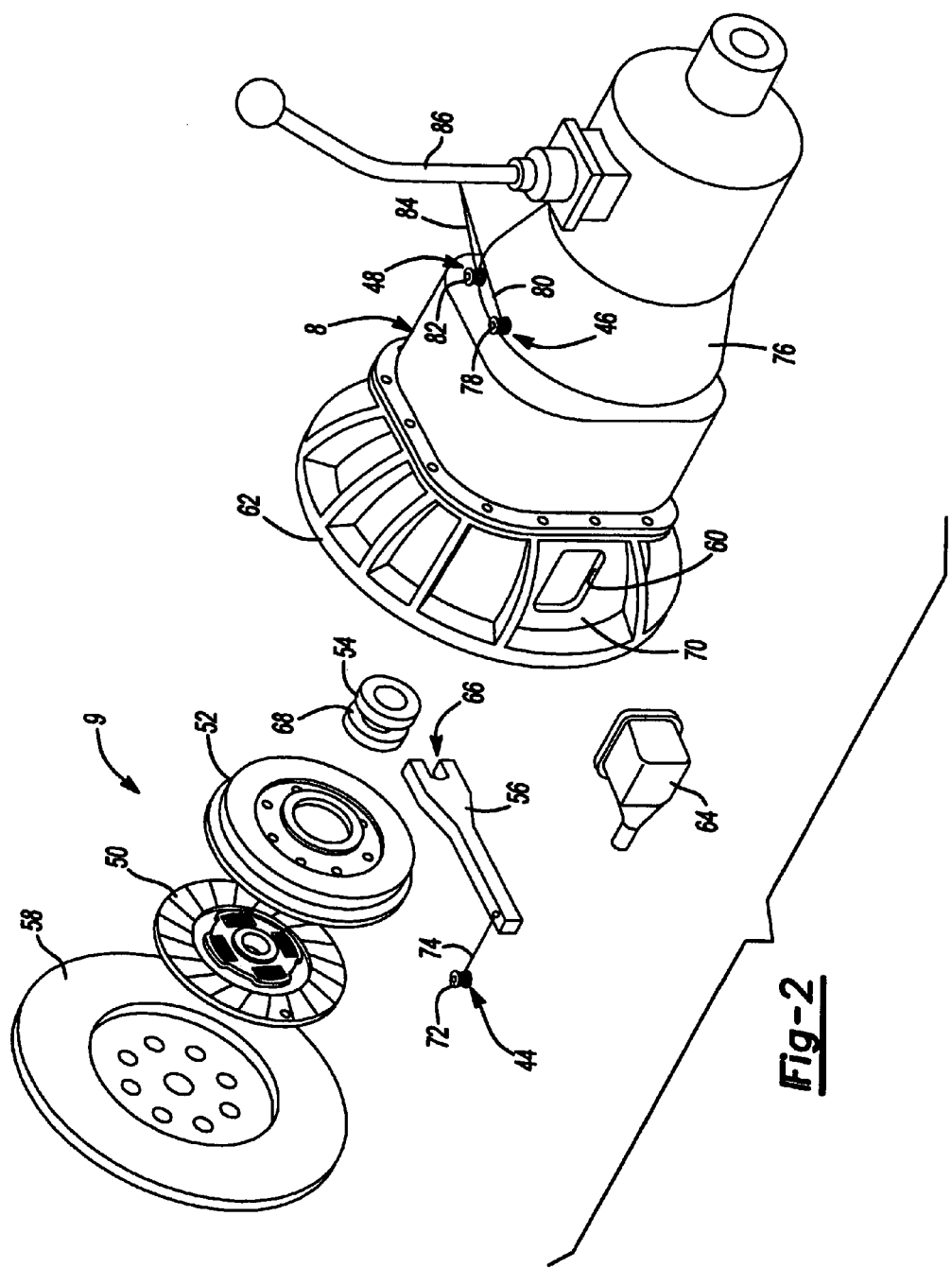
FIG. 2 is an exploded perspective view of an exemplary manual transmission and clutch assembly equipped with a clutch plate position sensor and a shifter shaft position sensor constructed in accordance with the teachings of the present invention.

Referring to FIG. 2, clutch assembly 9 includes a clutch plate 50, a pressure plate 52, a throw-out bearing 54 and a clutch fork 56. Clutch plate 50 is selectively engageable with a flywheel 58 of engine 6. Clutch assembly 9 is operable in an engaged mode where engine torque is transferred from flywheel 58 to transmission 8 and a disengaged mode where torque is not transferred from engine 6 to transmission 8. Clutch fork 56 extends through an aperture 60 formed in a bell housing 62 coupled to transmission 8. A boot 64 sealingly engages clutch fork 56 and bell housing 62 to prevent contaminant ingress to clutch assembly 9. Clutch fork 56 is pivotable relative to the housing 62. A bifurcated end 66 of clutch fork 56 is positioned within an annular groove 68 of throw-out bearing 54. Accordingly, movement of clutch fork 56 causes axial displacement of throw-out bearing 54. As throw-out bearing 54 moves, pressure plate 52 also moves causing clutch plate 50 to drivingly engage or disengage flywheel 58.

Clutch plate position sensor 44 is mounted to an external surface 70 of bell housing 62. Clutch plate position sensor includes a reel 72 having a wire 74 wound thereon. One end of wire 74 is coupled to shifter fork 56. As clutch fork 56 moves, a length of wire 74 is paid out from reel 72. The linear length of wire paid out from reel 72 is measured and an appropriate signal is output to controller 24. An encoder or other measurement device may be sued to determine the length of wire 74 extended from reel 72. The length of wire paid out at any one time correlates to the position of clutch plate 50. A look-up table or an algorithm may be created for controller 24 to correlate the data provided by clutch plate position sensor 44 and the true position of clutch plate 50. As an additional feature, clutch wear may be monitored throughout the length of the vehicle by monitoring changes in output of clutch plate position sensor 44.

First shifter shaft position sensor 46 and second shifter shaft position sensor 48 are preferably coupled to an outer surface 76 of transmission 8. First shifter shaft position sensor 46 includes a reel 78 having a length of wire 80 wound thereon. Similarly, second shifter shaft position sensor 48 includes a reel 82 and a wire 84. Wires 80 and 84 are coupled to a shifter shaft 86. Shifter shaft 86 is selectively moveable by operator to obtain a number of drive ratios.

FIG. 3 depicts a shift pattern for a five-speed manual transmission. The extreme positions of each column correspond to a desired speed ratio. Specifically, position 00 corresponds to reverse gear. Position 010 corresponds to first gear. Position 40 corresponds to second gear. Position 410 corresponds to third gear. Position 80 corresponds to fourth gear, and position 810 is indicative of fifth gear. When the manual transmission is in neutral, the shifter shaft is located at position 45. Shifter shaft positions intermediate the gear positions previously mentioned are also identified in FIG. 3. The data output from first shifter shaft position sensor 46 and second shifter shaft position sensor 48 allows controller 24 to determine at which location of the shift pattern the shifter shaft is located.

Figure 4:
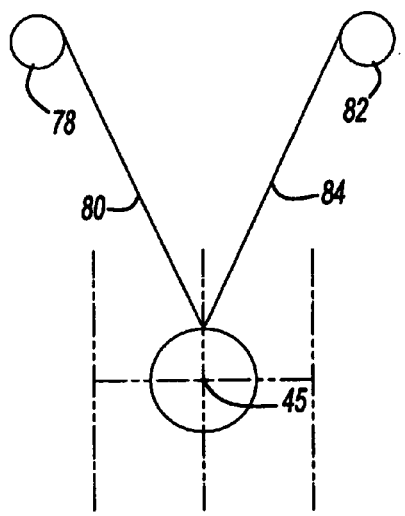
FIGS. 4–7 are schematic diagrams depicting the relation between the shifter shaft position sensors and the shifter shaft at various locations within a shift pattern.

FIG. 4 represents shifter shaft 86 as being located in neutral at position 45. Controller 24 receives an output from first shifter shaft position sensor 46 that a certain length of wire 80 is extended from reel 78. Similarly, second shifter shaft position sensor 48 provides a signal to controller 24 indicating the length of wire 84 presently extended from reel 82. Because the length of wire 80 and the length of wire 84 are equal and of a certain magnitude, controller 24 correlates the location of shifter shaft 86 with neutral position 45.

Figure 5:
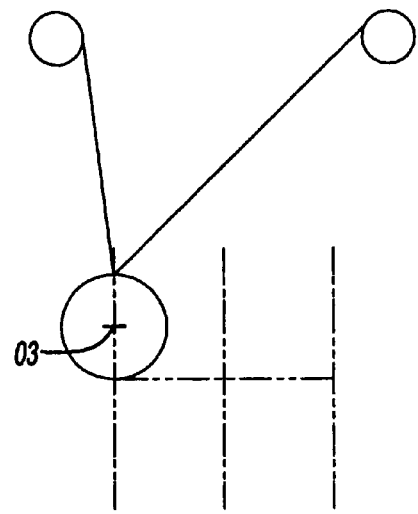

FIG. 5 depicts shifter shaft 86 as being within the gate between reverse and first gears. Based on the lengths of wires 80 and 84, controller 24 is able to determine that shifter shaft 86 is positioned at location 03 in FIG. 5. Controller 24 is operable to continuously monitor the length of wires 80 and 84 and track the movement of shifter shaft 86 during vehicle operation. In this manner, controller 24 may determine the direction in which shifter shaft 86 is being moved and the speed at which the shaft is being moved by comparing shifter shaft location versus time.

Figure 6:
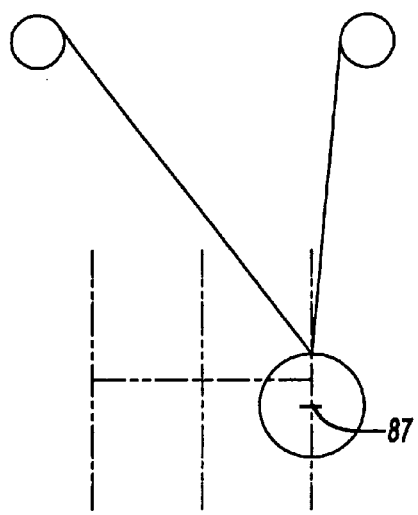
Figure 7:
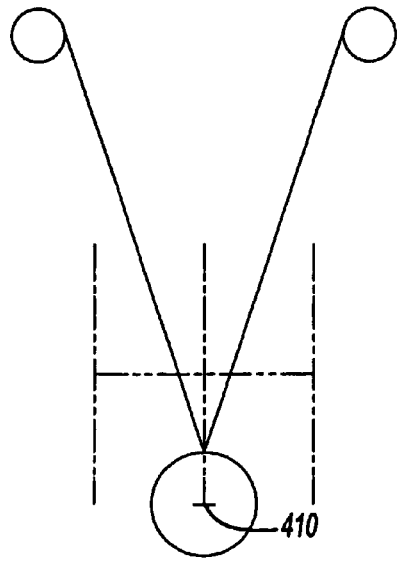

FIGS. 6 and 7 provide additional examples of alternate shifter shaft locations and the corresponding lengths of wires 80 and 84. In particular, FIG. 6 relates to a shifter shaft position between fourth and fifth gears corresponding to position 87. FIG. 7 depicts wires 80 and 84 being of equal length. The length of wires 80 and 84 corresponds to position 410 indicating that the transmission is in third gear.

It should be appreciated that the clutch plate position sensor and shifter shaft position sensor embodiments previously described are merely exemplary and that any number of position determining techniques may be used without departing from the scope of the present invention. Specifically, it is contemplated that optical measurement systems, hall effect sensors, switches, proximity sensors or other devices may be used to output a signal to controller 24 indicative of the position of a clutch plate and/or a shifter shaft. Additionally, other components within the clutch may be instrumented to provide an indication of clutch engagement or disengagement.

In operation, controller 24 determines if the engine is exhibiting characteristic indicating that it may be transitioned from an activated mode to a deactivated mode based on the signals generated by accelerator pedal position sensor 42, engine speed sensor 28, first and second intake manifold pressure sensors 32 and 34 and brake pedal position sensor 43. If the aforementioned data indicates that a transition is possible, controller 24 monitors clutch plate position sensor 44 to determine if clutch plate 50 is becoming disengaged from flywheel 58. At the time clutch plate 50 begins to disengage flywheel 58, data output from first shifter shaft position sensor 46 and second shifter shaft position sensor 48 is monitored to determine if the operator is shifting into a higher gear, also known as upshifting. If so, engine 6 is transitioned into the deactivated mode. One skilled in the art will appreciate that the transition may occur before the higher gear is actually engaged by the driver. This differs from commonly known automatic transmission algorithms where the transition occurs only after the shift is fully completed.

The design of manifold 10 further enhances the operation of the engine control system of the present invention by allowing throttle A in communication with first passageway 12 to be individually controlled in relation to throttle B in communication with second passageway 14. The presence of multiple throttles in communication with separate intake passageways allows DOD transitions to be made without fluctuations in the engine torque output curve. Ideally, a transition may occur when clutch assembly 9 is fully engaged, fully disengaged or partially engaged with flywheel 58.

One skilled in the art will appreciate that the dual throttle, multiple passageway intake system previously described is merely exemplary and that the control system of the present invention is operable with any number of intake systems including singular or multiple throttles. For example, an eight cylinder engine equipped with four throttles having four intake passageways would be desirable. Each of the throttles and intake passageways provide air and fuel to two of the combustion chambers. Accordingly, implementation of the control system of the present invention should not be limited based on the examples described herein.

Figure 8:
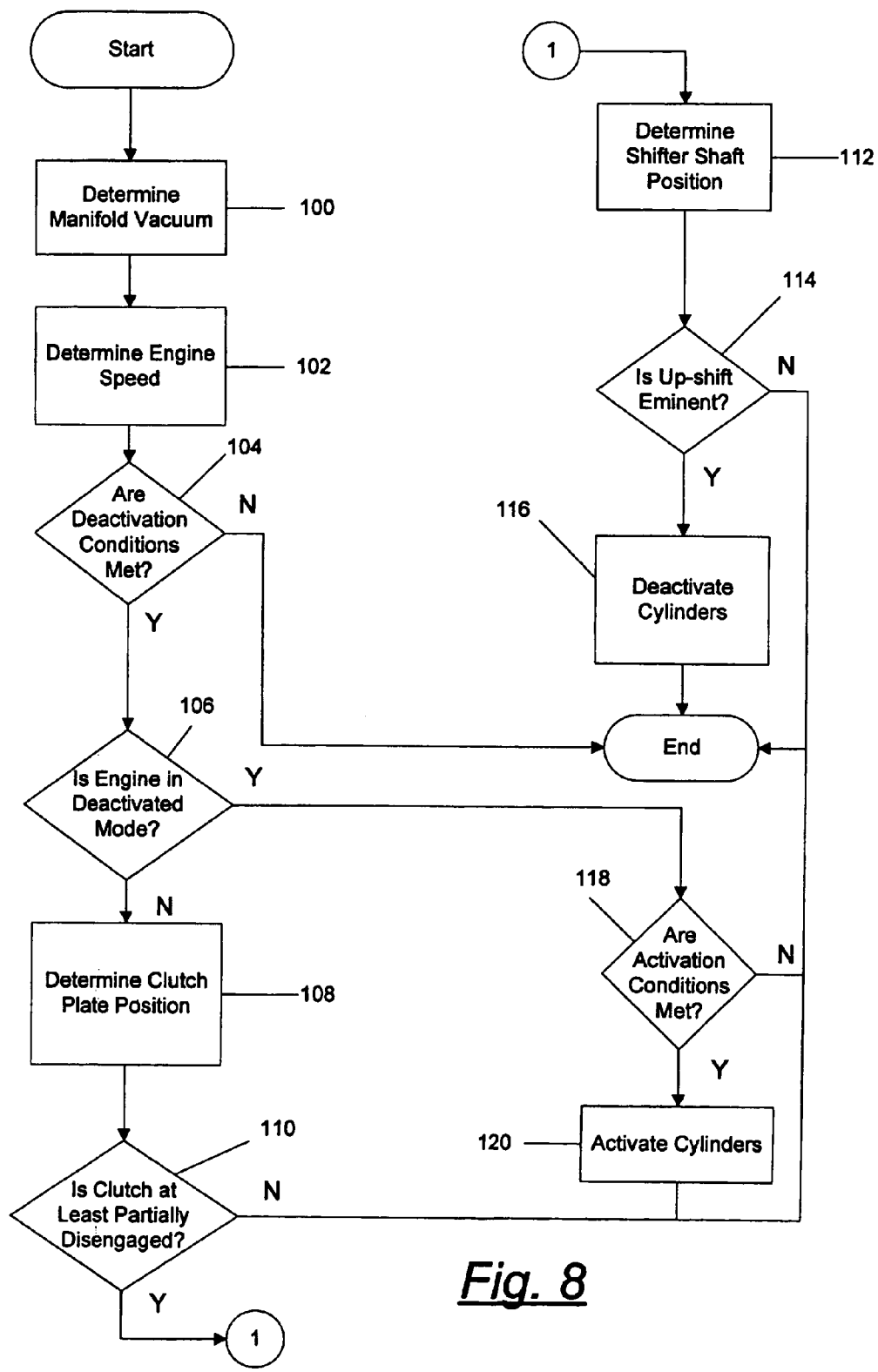
FIG. 8 is a flowchart illustrating steps performed by the DOD control system of the present invention.

Referring to FIG. 8, steps of a DOD control method according to the present invention are shown. In step 100, the outputs from intake manifold pressure sensors 32 and 34 are converted to manifold vacuum. Manifold vacuum is an indicator of engine load. The higher the intake manifold vacuum, the lower the engine load.

In step 102, engine speed sensor 28 provides a signal indicative of the engine speed. In step 104, controller 24 determines whether deactivation conditions have been met. For example, transitioning to the deactivated mode would be allowed to occur when the manifold vacuum exceeds a predetermined value. The predetermined vacuum value may vary with engine speed. As such both parameters are measured. If the deactivation conditions are met, controller 24 continues with step 106.

In step 106, controller 24 determines whether engine 6 is currently operating in a deactivated mode. If false, controller 24 continues with step 108. If the engine is presently operating in a deactivated mode, controller 24 proceeds with step 118.

In step 108, clutch plate position sensor 44 provides a signal indicative of the location of clutch plate 50. Based on the output from clutch plate position sensor 44, controller 24 determines if clutch assembly 9 is in a disengaged, engaged, or partially engaged mode with flywheel 58 at step 110. If the clutch is in a disengaged or at least partially disengaged position, controller 24 continues to step 112.

In step 112, first shifter shaft position sensor 46 and second shifter shaft position sensor 48 provide signals indicative of the length of wires 80 and 84 extending therefrom. Controller 24 correlates the wire lengths to a shifter shaft position.

In step 114, controller 24 determines if an upshift is about to occur. If so, controller 24 continues at step 116. In step 116, transitioning from activated mode to deactivated mode begins. In the example presented, throttle A begins to close while throttle B begins to open. Both throttles move until throttle A is completely closed. At this time, the fuel supply to throttle A may be discontinued.

To complete the control logic analysis, reference is once again made to step 106. If the engine is presently in the deactivated mode, controller 24 continues to operate at step 118.

In step 118, controller 24 determines if conditions exist to transition engine 6 from the deactivated mode to the activated mode. If so, controller 24 proceeds to step 120.

At step 120, the deactivated cylinders are activated. During activation, fuel supply is returned to throttle A. Throttle A slowly opens as throttle B slowly closes to maintain a smooth torque output curve. Both throttles continue to move until throttle A and throttle B are at substantially the same position.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for controlling transitions between activated and deactivated modes in a displacement on demand engine for a vehicle having a manual transmission, the control system comprising:
   a clutch position sensor that generates a clutch position signal;
   a shifter shaft position sensor that generates a shifter shaft position signal; and
   a controller that transitions the engine from the activated mode to the deactivated mode when the clutch is in at least a partially disengaged position based on said clutch position sensor signal and when an upshift is about to occur based on said shifter shaft position sensor signal.

2. The engine control system of claim 1 further including an engine intake manifold sensor that generates an intake manifold vacuum signal, wherein said controller is operable to transition the engine from the activated mode to the deactivated mode when said intake manifold vacuum signal is greater than a predetermined value.

3. The engine control system of claim 2 further including an engine speed sensor that generates an engine speed signal, wherein the controller calculates said predetermined value based on said engine speed signal.

4. The engine control system of claim 1 wherein said shifter shaft position sensor includes a first measuring device coupled to said shifter shaft and a second measuring device coupled to said shifter shaft, said first and second measuring devices being spaced apart from one another.

5. The engine control system of claim 4 wherein said first measuring device includes a retractable wire having a first end coupled to said shifter shaft, said first measuring device operable to output a signal corresponding to an extended length of said wire.

6. The engine control system of claim 1 wherein the engine includes a first throttle in communication with a first set of cylinders and a second throttle in communication with a second set of cylinders, wherein transitioning the engine from the activated mode to the deactivated mode includes closing said first throttle and opening said second throttle.

7. The engine control system of claim 6 wherein the engine includes an intake manifold having first and second passageways, said first passageway being separated from said second passageway and in communication with said first set of cylinders.

8. A method for controlling transitions between activated and deactivated modes in a displacement on demand engine for a vehicle having a manual transmission, the method comprising:
   determining a clutch position;
   determining a shifter shaft position;
   determining if an upshift is about to occur; and
   transitioning from the activated to the deactivated mode when the clutch is in at least a partially disengaged position and an upshift is about to occur.

9. The method of claim 8 wherein the step of determining a shifter shaft position includes determining a first distance between said shifter shaft and a first reference point and determining a second distance between said shifter shaft and a second reference point spaced apart from said first reference point.

10. The method of claim 9 wherein the step of determining a shifter shaft position includes correlating said first and second distances to a shift pattern of said shifter shaft.

11. The method of claim 10 wherein the step of determining a clutch position includes determining a distance between a moveable clutch member and a fixed reference point.

12. The method of claim 11 wherein said moveable clutch member includes a clutch fork.

13. The method of claim 8 wherein the step of determining if an upshift is about to occur includes comparing a previous location of said shifter shaft to a current position of said shifter shaft.

14. The method of claim 13 wherein the step of determining if an upshift is about to occur includes determining if said shifter shaft is being moved toward a higher gear position.

15. The method of claim 8 further including transitioning from the deactivated mode to the activated mode when the manifold vacuum is less than a predetermined value.

16. The method of claim 15 further including opening a first throttle and closing a second throttle to maintain a substantially constant torque output.

17. The method of claim 16 further including continuing to open the first throttle and close the second throttle until the throttle positions are substantially equal.

18. The method of claim 8 further including determining an intake manifold vacuum and allowing said transitioning step to occur if said intake manifold vacuum is greater than a predetermined limit.

19. The method of claim 18 further including opening a first throttle and closing a second throttle to maintain a substantially constant torque output.

20. The method of claim 19 further including continuing to close said second throttle and discontinue fuel supply to said second throttle.

21. The method of claim 8 further including determining an engine speed and allowing said transitioning step to occur if said engine speed is within a predefined range.

* * * * *